US012422533B2

(12) United States Patent
Coleman et al.

(10) Patent No.: US 12,422,533 B2
(45) Date of Patent: Sep. 23, 2025

(54) SYSTEM AND METHOD FOR EMULATING ECHO SIGNALS FOR LIDAR SENSOR

(71) Applicant: Keysight Technologies, Inc., Santa Rosa, CA (US)

(72) Inventors: Christopher L. Coleman, Santa Clara, CA (US); Gregory W. Eng, Santa Clara, CA (US); Paul Lewis Corredoura, Redwood City, CA (US); Bogdan Szafraniec, Sunnyvale, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 952 days.

(21) Appl. No.: 17/551,650

(22) Filed: Dec. 15, 2021

(65) Prior Publication Data

US 2022/0260694 A1    Aug. 18, 2022

Related U.S. Application Data

(60) Provisional application No. 63/150,874, filed on Feb. 18, 2021.

(51) Int. Cl.
| | | |
|---|---|---|
| *G01S 7/481* | (2006.01) | |
| *G01S 7/484* | (2006.01) | |
| *G01S 7/4865* | (2020.01) | |
| *G01S 7/497* | (2006.01) | |
| *G01S 17/931* | (2020.01) | |
| *G02B 6/26* | (2006.01) | |
| *G02B 27/30* | (2006.01) | |

(52) U.S. Cl.
CPC ............ *G01S 7/497* (2013.01); *G01S 7/4815* (2013.01); *G01S 7/4816* (2013.01); *G01S 7/484* (2013.01); *G01S 7/4865* (2013.01); *G01S 17/931* (2020.01); *G02B 6/262* (2013.01); *G02B 27/30* (2013.01)

(58) Field of Classification Search
CPC ...... G01S 7/497; G01S 7/4865; G01S 7/4815; G01S 7/484; G01S 17/931; G01S 7/4816; G02B 27/30; G02B 6/262; G02B 6/32
USPC ....................................................... 356/5.01
See application file for complete search history.

(56) References Cited

U.S. PATENT DOCUMENTS

| | | |
|---|---|---|
| 2015/0192677 A1 | 7/2015 | Yu et al. |
| 2020/0103507 A1 | 4/2020 | Kirillov et al. |

OTHER PUBLICATIONS

"An Overview of Our Light Shaping Diffusers", Luminit, Nov. 16, 2020, https://www.luminitco.com/products/light-shaping-diffusers, 5 pgs.

(Continued)

*Primary Examiner* — Daniel L Murphy

(57) ABSTRACT

A system is provided for emulating return optical pulses from at least one emulated target in response to a time of flight (TOF) lidar signal. The system includes an optical blocker configured to partially reflect or guide emitted optical pulses emitted by a TOF lidar sensor; a detector configured to detect the partially reflected or guided optical pulses, and to output corresponding electrical pulses; an electrical delay circuit configured to delay the electrical pulses to indicate distance to the at least one emulated target relative to the TOF lidar sensor; at least one laser configured to reemit return optical pulses in response to the delayed electrical pulses; a collimator configured to collimate the return optical pulses; and a diffuser configured to diffuse the collimated return optical pulses over a predetermined range of azimuthal angles toward the TOF lidar sensor.

20 Claims, 4 Drawing Sheets

(56) References Cited

OTHER PUBLICATIONS

H.W. Yoo et al., "MEMS-based lidar for autonomous driving", Elektrotechnik & Informationstechnik, 2018, pp. 408-415.
H. S. Ayoub et al., "Design and test of high-efficiency dual-element laser diffuser for large-field automotive shadowgraphy", J Opt (Jun. 2020) 49(2), pp. 263-269.

SYSTEM AND METHOD FOR EMULATING ECHO SIGNALS FOR LIDAR SENSOR

CROSS-REFERENCE TO RELATED APPLICATION

A claim of priority is made under 35 U.S.C. § 119(e) to U.S. Provisional Application 63/150,874 filed on Feb. 18, 2021. The entire disclosure of U.S. Provisional Application 63/150,874 is hereby specifically incorporated by reference herein.

BACKGROUND

Advanced driver-assistance systems (ADASs) and autonomous driving systems for vehicles rely on detection and ranging systems that use detection and ranging electromagnetic signals, including millimeter wave radio detection and ranging (Radar) signals and light detection and ranging (lidar) signals. The detection and ranging electromagnetic signals are used to warn of forward collisions and backward collisions, to implement adaptive cruise control and autonomous parking, for example, and ultimately to perform autonomous driving on streets and highways. The detection and ranging electromagnetic signals are intended to be used under various types of weather conditions. Automotive radar and lidar operate over the range of approximately 1 m to 300 m, for example.

Conventional ADASs and autonomous driving systems typically have multiple transmitters and receivers on the vehicle. Actual driving environments in which the radar systems may be deployed can vary greatly, and many such driving environments may be complex. For example, actual driving environments may contain numerous objects, some of which may objects encountered in actual driving environments have complicated reflection, diffraction and multi-time reflection characteristics that affect echo signals responsive to the detection and ranging signals. The immediate consequences of incorrectly sensing and/or interpreting echo signals may be that false warnings or improper reactions are triggered or warnings or reactions that should be triggered are not, which in turn can lead to collisions. Also, testing in actual driving environments is time consuming and expensive to perform.

Lidar, in particular, has the potential to become the main sensor for ADASs and automotive autonomous driving systems due to its ability to provide accurate and long-range three-dimensional (3D) information for localization and mapping applications, as well as for object detection collision avoidance. Lidar is a scanning process that rapidly measures the distance to objects at a number of different directions from the sensor. To cover an entire field of view, repetitive measurements are performed, and the results from different angles and time instances are stored as a point cloud. Generally, lidar systems operate by generating optical pulses from a light (laser) source fixed within a sensor and measuring the reflected pulses.

One type of lidar is known as a time-of-flight (TOF) lidar, which includes a lidar sensor that emits (transmits) optical pulses to the surroundings, receives corresponding return optical pulses reflected from an object (target) in response to the emitted optical pulses, and measures time delay between the emitted optical pulses and the return optical pulses to determine the distance to the target. Generally, to produce a 3D image of the surroundings, the emitted optical pulses are emitted in a cone pattern that covers a range of azimuthal angles and/or elevation angles. Therefore, to test TOF lidar, in particular, conventional lidar simulators receive emitted optical pulses over the range of azimuthal angles and/or elevation angles, add delay to emulate distances to emulated targets, and transmit delayed return optical pulses back to the lidar sensor. However, the returning optical pulses need to preserve the direction of the emitted optical pulses, i.e., they must arrive back to the lidar sensor at the same azimuthal and elevation angles. Accordingly, conventional lidar testers (environment simulators) are limited to supporting only discrete number of azimuthal angles and elevation angles.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
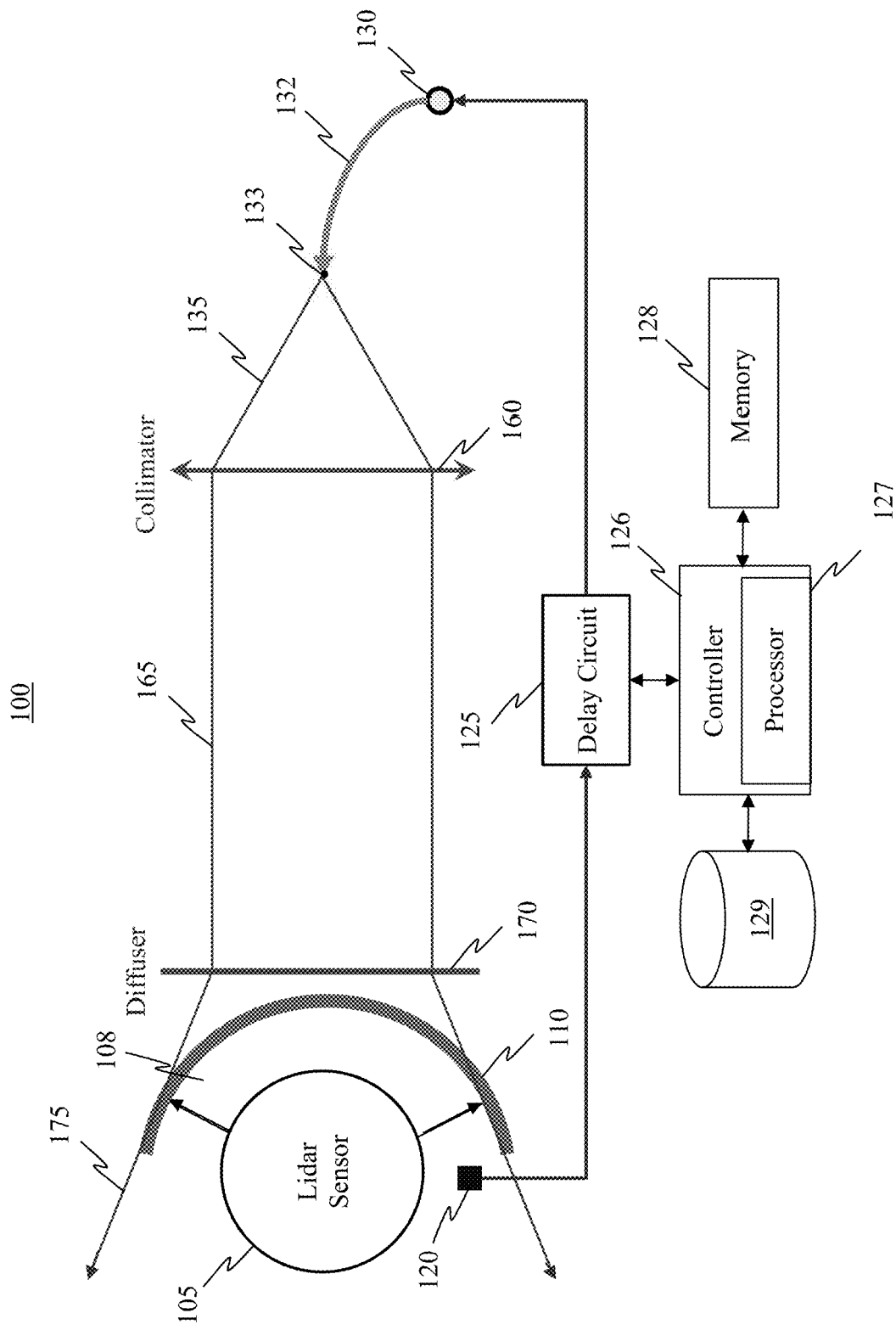
FIG. 1A is a simplified top plan view of a system for emulating echo signals for a lidar device under test (DUT), according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, according to various representative embodiments, lidar tester systems and methods are provided for emulating echo signals reflected from one or more emulated targets in a 3D simulation scene in response to a lidar signal transmitted by a lidar sensor in order to accurately simulate the physical world to the lidar sensor, where the lidar signal comprises optical pulses emitted over a large range of azimuthal angles and one or more discrete elevation angles. The lidar tester may provide physical world simulation that presents driving scenarios to the lidar sensor, as well as to other computers of a vehicle under test, for example, that depend on the lidar sensor's measurements, e.g., for testing, debugging and/or certifying various electronics and associated firmware and software without having to actually drive the vehicle under test. The lidar tester system includes a diffuser for diffusing return optical pulses to cover the large range of azimuthal angles simultaneously, and multiple lasers to cover multiple elevation angles. The lidar tester system provides a robust simulation of the physical world using a low cost, easily implementable optical design.

According to a representative embodiment, a system is provided for emulating return optical pulses from at least one emulated target in response to a time of flight (TOF) lidar signal. The system includes an optical blocker configured to partially reflect emitted optical pulses emitted by a TOF lidar sensor; a detector configured to detect the partially reflected optical pulses, and to output corresponding electrical pulses; an electrical delay circuit configured to delay the electrical pulses to indicate distance to the at least one emulated target; at least one laser configured to reemit return optical pulses in response to the delayed electrical pulses; a collimator configured to collimate the return optical pulses; and a diffuser configured to diffuse the collimated return optical pulses over a predetermined range of azimuthal return angles toward the TOF lidar sensor.

According to a representative embodiment, a method is provided for emulating return optical pulses from at least one emulated target in response to optical pulses emitted from a TOF lidar DUT. The method includes partially reflecting or guiding emitted optical pulses toward a detector, where the emitted optical pulses are emitted by the lidar DUT over a multiple transmission angles; receiving the partially reflected or guided optical pulses at the detector, and converting the partially reflected or guided optical pulses into corresponding electrical pulses; delaying the electrical pulses to represent distance to the at least one emulated target; generating return optical pulses by at least one laser in response to the delayed electrical pulses, and reemitting the return optical pulses from the at least one laser to the lidar DUT; collimating the reemitted return optical pulses; and diffusing the collimated return optical pulses over multiple return angles respectively corresponding to at least the plurality of transmission angles, enabling the lidar DUT to associate the diffused return optical pulses with the emitted optical pulses.

According to a representative embodiment, a system is provided for emulating return optical pulses from at least one emulated target in response to a lidar signal. The system includes an optical blocker configured to partially reflect or guide optical pulses emitted by a lidar device DUT, where the optical pulses are emitted over a predetermined pseudo-continuous range of azimuthal transmission angles and at discrete elevation transmission angles; a detector configured to detect the partially reflected or guided optical pulses, and to output corresponding electrical pulses; an electrical delay circuit configured to delay the electrical pulses according to distances to the at least one emulated target; multiple lasers configured to reemit return optical pulses in response to the delayed electrical pulses, where each laser corresponds to one of the discrete elevation transmission angles; a collimator configured to collimate the return optical pulses; and a diffuser configured to diffuse the collimated return optical pulses over a predetermined range of azimuthal return angles toward the lidar DUT, where the predetermined range of azimuthal return angles is continuous, thereby covering the predetermined pseudo-continuous range of azimuthal transmission angles.

Figure 1B:
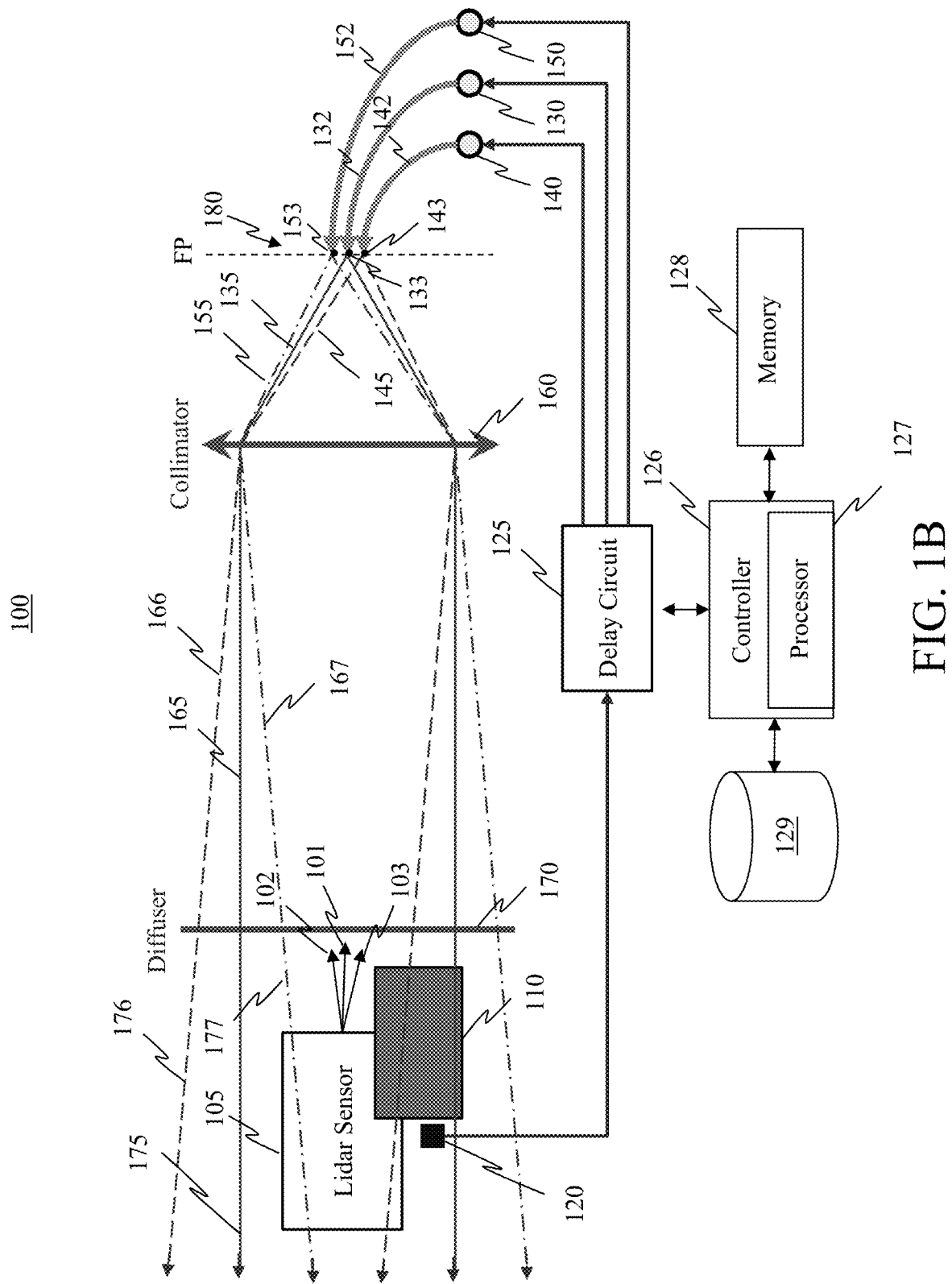
FIG. 1B is a simplified side plan view of a system for emulating echo signals for a lidar DUT, according to a representative embodiment.

FIG. 1A is top plan view of a system for emulating echo signals for a lidar DUT (lidar sensor), and FIG. 1B is side plan view of a system for emulating echo signals for a lidar DUT, according to a representative embodiment. As will be appreciated by one of ordinary skill in the art having the benefit of the present disclosure, one likely lidar DUT is automobile lidar sensor used in various capacities in current and emerging automobile ADAS and autonomous driving applications. However, it is emphasized that the presently described lidar tester system is not limited to automobile lidar sensors, and can be applied to other types of vehicles that could employ a vehicular lidar, including trucks, busses, motorcycles, bicycles, motorized bicycles (e.g., scooters) and aircraft, for example.

Referring to FIG. 1A, lidar tester system 100 is configured to emulate echo signals reflected from one or more emulated targets in a 3D simulation scene in response to a TOF lidar signal transmitted by a lidar DUT (lidar sensor) 105 for physical world and/or environment simulation. The lidar DUT 105 may be freestanding or mounted on a vehicle being tested, for example. The lidar DUT 105 includes a laser that emits a lidar signal comprising optical (laser) pulses over a predetermined range of azimuthal transmission angles 108. The range of azimuthal angles may vary from a range that covers a substantially forward facing direction, as illustrated in FIG. 1, to a full angle of 360 degrees. Generally, the lidar DUT 105 generates optical pulses that reflect from a spinning mirror in different azimuth directions during one 360 degree rotation (scan) of the spinning mirror, which may be rotating at about 1 to 100 times per second, for example. Of course, the lidar DUT 105 may include other types of lidar configured to emit optical pulses over the predetermined range of azimuthal transmission angles, without departing from the scope of the present teachings, as would be apparent to one skilled in the art. Generally, the lidar DUT 105 includes transmitters for transmitting the emitted optical pulses and receivers paired with the transmitters for receiving the return (echo) optical pulses from one or more emulated targets.

The predetermined range of azimuthal transmission angles 108 is pseudo-continuous, in that the optical pulses are emitted at incrementally separated discrete angles in an azimuthal plane over the predetermined range of azimuthal transmission angles 108 and their discretization. In the depicted example, the predetermined range of azimuthal transmission angles 108 covers about ±60 degrees in 0.25 degree increments, for purposes of illustration. Because of the large number of optical pulses being emitted over this pseudo-continuous predetermined range in relatively small increments, the lidar coverage appears continuous, as a practical matter. Thus, pseudo-continues means discrete angular transmission that are dense enough to appear continuous. Of course, the transmission range and discrete angular increments may vary to provide unique benefits for any particular situation or to meet application specific design requirements of various implementations, as would be apparent to one skilled in the art, without departing from the scope of the present teachings.

The system 100 generates and transmits an echo signal comprising return optical pulses responsive to the emitted optical pulses, thereby emulating echo signals reflected from the one or more emulated targets. The system 100 sends the return optical pulses to the lidar DUT 105 over the entire range of azimuthal angles over which the test laser transmitted the emitted optical pulses, as discussed below. Generally, the lidar DUT 105 knows the discrete values of azimuthal angles (and elevation angles) at which it transmits the emitted optical pulses, and counts them. The lidar DUT 105 also counts the return optical pulses received over a continuous range of azimuthal angles from the system 100, and thereby associates the return optical pulses with the emitted optical pulses transmitted at discrete azimuthal angles, respectively.

In the depicted embodiment, the system 100 includes an optical blocker 110 and a detector 120. The optical blocker 110 is configured to partially reflect or guide the emitted optical pulses to the detector 120, which receives and converts the partially reflected or guided optical pulses to corresponding electrical pulses. The optical blocker 110 may be a metal box, a mirror, or an optical guide, for example, that intercepts the emitted optical pulses and minimizes the reflections back to the lidar DUT 105. The detector 120 may include any compatible optical transducers, such as avalanche photo diodes, photo diodes and/or photo resistors, for example. Ideally, the optical blocker 110 is designed to be invisible to the lidar DUT 105, in that the emitted optical pulses are not reflected by optical blocker 110 back to the lidar DUT 105, while still providing sufficient strong optical pulses to the detector 120. For example, if the lidar transmitter and the lidar receiver in the lidar DUT 105 are spatially separated, the optical blocker 110 covers only the transmitter while the receiver remains fully exposed. The exact design of the optical blocker 110 depends on the construction of the lidar DUT 105 so that it is able to intercept the optical pulses without being viable to the lidar DUT 105. The reflections from the optical blocker 110 to the detector 120 are strong enough for all azimuthal and elevation transmission angles of the emitted optical pulses to be detected. The emulation of discrete elevation transmission angles is discussed below with reference to FIG. 1B.

The system 100 further includes an electrical delay circuit 125 configured to delay the electrical pulses from the detector 120 by delay amounts corresponding to distances to the one or more emulated targets, respectively. Generally, the delays are in a range of about 5 ns to about 2000 ns, which correspond to distances of about 1 m to about 300 m, respectively. The amount of the delay may be controlled by a controller 126, as discussed below. For example, the electrical delay circuit 125 may include selectable delay elements that are configured for the 3D simulation scene under control of the controller 126. The selectable delay elements may be implemented within field programmable gate array (FPGA) by delay counters, for example.

A first laser 130 of the system 100 is configured to receive the delayed electrical pulses from the electrical delay circuit 125, and to emit the return optical pulses back to the lidar DUT 105 in response. By converting the electrical pulses back into optical pulses, the first laser 130 is reemitting the return optical pulses in response to the emitted optical pulses from the lidar DUT 105. The first laser 130 may be any compatible laser source, such as a laser diode or a vertical-cavity surface-emitting laser (VCSEL), for example. In the depicted embodiment, the first laser 130 is connected to an optical fiber 132 having fiber end 133. In alternative configurations, the optical fiber 132 may not be included, in which case the return optical pulses are directly emitted from the first laser 130, as opposed being emitted from the fiber end 133. The return optical pulses generated by the first laser 130 pass through the optical fiber 132 and are emitted from the fiber end 133, which is substantially in the focal plane of the collimator 160. Light from the fiber end 133 is emitted into a cone angle 135 defined by a numerical aperture of the optical fiber 132.

The system 100 includes optical elements for directing the return optical pulses emitted by the first laser 130 to the lidar DUT 105. In the depicted embodiment, the optical elements of the system 100 include a collimator 160 and a diffuser 170. The collimator 160 is configured to collimate the return optical pulses using one or more collimator lenses into a collimated beam 165. The collimated beam 165 that emerges from the collimator 160 comprises highly parallel optical rays that all belong to the desired elevation angle and a single azimuthal angle. The diffuser 170 is configured to diffuse the collimated return optical pulses over a predetermined range of continuous azimuthal return angles toward the lidar DUT 105, indicated by diffusion pattern (angular range) 175. At the diffuser 170, the elevation angle(s) are highly preserved, but the single azimuthal angle of the collimated beam 165 is converted into the predetermined range of azimuthal return angles and delivered to the receiver of the lidar DUT 105. The predetermined range of continuous azimuthal return angles of the diffusion pattern 175 approximates predetermined range of discrete azimuthal transmission angles 108, ensuring that each emitted optical pulse transmitted at a discrete azimuthal transmission angle has a corresponding return optical pulse returned at the same azimuth angle. In an alternative configuration, the return optical pulses from the optical fiber 132 may be split, using a fiber optic splitter for example, and simultaneously provided to multiple collimators and diffusers to cover an arbitrarily large range of the azimuthal angles.

More particularly, short optical pulses, e.g., about 3 ns to about 7 ns in width, are emitted from the lidar DUT 105 sequentially at different discrete azimuthal transmission angles. There is a time separation between the emitted optical pulses that is larger than the round trip of the optical pulses over the maximum distance covered by the lidar. The time delay between an emitted optical pulse and the corresponding return optical pulse at the same azimuthal angle determines the distance to the emulated target. That is, the lidar DUT 105 listens for the return optical pulse for a predetermined time duration that is long enough for the round trip over the maximum distance of the lidar DUT 105. When a return optical pulse is received, the time delay is measured to determine the distance. At the end of the time duration, the lidar DUT 105 sends the next emitted optical pulse at the same azimuthal transmission angle (regardless of whether a return optical pulse has been received), and again listens for the time duration. Since the emitted optical pulses are emitted sequentially, each optical pulse corresponds to a specific azimuthal transmission angle, as discussed above. This specific azimuthal transmission angle must be included within the range of the azimuthal receive angles provided by the collimator 160 and the diffuser 170 (or by multiple collimators/diffusers). Thus, the system 100 enables the lidar DUT 105 to associate the return optical pulses received from the diffuser 170 at various azimuthal return angles with corresponding emitted optical pulses initially transmitted by the lidar DUT 105 at the corresponding azimuthal transmission angles.

Figure 2A:
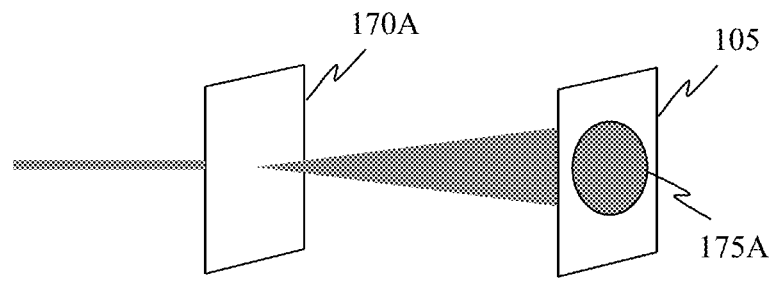
FIG. 2A is a simplified schematic diagram showing a diffusion pattern of a circular diffuser, according to representative embodiment.
Figure 2B:
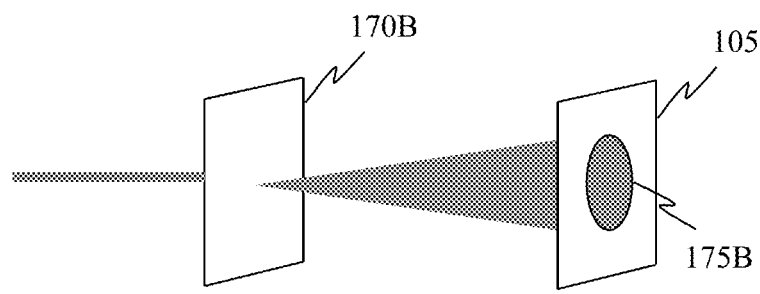
FIG. 2B is a simplified schematic diagram showing a diffusion pattern of an elliptical diffuser, according to representative embodiment.
Figure 2C:
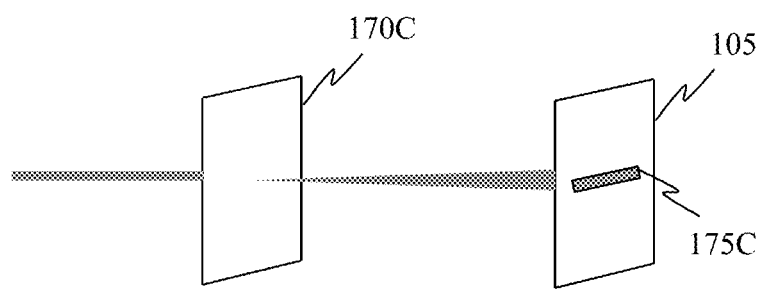
FIG. 2C is a simplified schematic diagram showing a diffusion pattern of a line diffuser, according to representative embodiment.

FIGS. 2A, 2B and 2C are simplified schematic diagrams respectively showing diffusion patterns of different types of diffusers, according to representative embodiments. FIG. 2A shows a circular diffuser 170A configured to emit rays of optical pulses in a diffusion pattern 175A having the shape of a circular cone. The circular cone may be directed at the lidar DUT 105 to provide a wide range of azimuthal angles and elevation angles. FIG. 2B shows an elliptical diffuser 170B configured to emit rays of optical pulses in a diffusion pattern 175B having the shape of an elliptical cone. The elliptical cone may be directed at the lidar DUT 105 to provide a wide range of azimuthal angles and a somewhat narrower range of elevation angles than the circular cone. FIG. 2C shows a line diffuser 170C configured to emit rays of optical pulses in a diffusion pattern 175C in the shape of an extreme elliptical cone (approaching a line). The extreme elliptical cone may be directed at the lidar DUT 105 to provide a wide range of azimuthal angles and a narrower range of elevation angles than the circular and elliptical cones, possibly a single elevation angle. The extreme elliptical cone of the line diffuser 170C may be approximated by a fan of the rays of optical pulses covering a range of azimuthal angles substantially within a plane, such as an azimuthal angle range of ±30 degrees as approximated in FIG. 2C, for example. In the vertical direction, the fan for the rays of extreme elliptical cone optical pulses may cover a range of about ±0.5 degrees of elevation angles, for example.

With regard to the line diffuser 170C, as the collimated beam from the collimator 160 gets larger and illuminates a larger area of the diffuser 170, nearly planar fans of rays in the diffusion pattern 175C are emitted from the entire illuminated area of the line diffuser 170C. That is, all illuminated points of the diffuser 170 emit light rays at all angles within the angular range of the nearly planar fans. Thus, for a large collimated beam as shown in FIG. 1A, for example, there are many light rays that have the same azimuthal angle and the same elevation angle, which ensures uniform spatial coverage of the lidar DUT 105.

Within the predetermined range of azimuthal return angles, there is an azimuthal angle that corresponds exactly to the azimuthal angle of each emitted optical pulse initially transmitted over the predetermined range of azimuthal transmission angles by the lidar DUT 105 and reflected by the optical blocker 110. Therefore, for every azimuthal angle of the emitted optical pulses there is an azimuthal angle of the return optical pulses. The return optical pulses provided by the first laser 130 and diffused by the diffuser 170 therefore preserve the direction of the emitted optical pulses from the lidar DUT 105, so that the return optical pulses arrive back at the lidar DUT 105 at the same azimuthal angles at which the corresponding emitted optical pulses were originally transmitted. Additional lasers and diffusers may be incorporated to increase the angular coverage of the system 100, if needed, to simulate all azimuthal angles covered by the lidar DUT 105. The return optical pulses directed to the lidar DUT 105 include information of at least simulated distance to the emulated target(s), as well as reflectivity, shape, or combinations thereof for analysis by the lidar DUT 105.

Referring to FIG. 1B, the lidar DUT 105 is also configured to emit the optical pulses at multiple discrete elevation transmission angles, indicated by representative first elevation transmission angle 101, second elevation transmission angle 102 and third elevation transmission angle 103. The different elevation transmission angles may be referred to as lidar layers. For purposes of illustration, the first elevation transmission angle 101 of the lidar DUT 105 is 0 degrees, which is in the same plane as the locus of signal emission from the first laser 130 of the system 100. The second elevation transmission angle 102 is positive (e.g., +1 degree) and the third elevation transmission angle is negative (e.g., −1 degree) in relation to the first elevation transmission angle 101 of the lidar DUT 105. The second and third elevation transmission angles 102 and 103 are matched by the angles created by the lasers 150 and 140 of the system 100. Of course, the number, directions and magnitudes of elevation transmission angles may vary to provide unique benefits for any particular situation or to meet application specific design requirements of various implementations, as would be apparent to one skilled in the art, without departing from the scope of the present teachings.

As discussed above with regard to azimuthal angles, the emitted optical pulses transmitted by the lidar DUT 105 at the different elevation transmission angles are partially reflected or guided by the optical blocker 110 to the detector 120, which receives and converts the partially reflected or guided optical pulses to corresponding electrical pulses. The electrical pulses are delayed by the electrical delay circuit 125 by delay amounts corresponding to distances to the one or more emulated targets, respectively.

The system 100 further includes multiple lasers in order to emulate echo signals at different elevation angles (different layers). Thus, in the depicted embodiment, the system 100 includes the first laser 130 (shown in FIG. 1A) that emits return optical signals at a first elevation return angle corresponding to the first elevation transmission angle 101, a second laser 140 that emits return optical signals at a second elevation return angle corresponding to the second elevation transmission angle 102, and a third laser 150 that emits return optical signals at a third elevation return angle corresponding to the third elevation transmission angle 103. The first laser 130 is connected to the optical fiber 132 having the fiber end 133. Likewise, the second laser 140 is connected to an optical fiber 142 having fiber end 143, and the third laser 150 is connected to an optical fiber 152 having fiber end 153. Each of the first, second and third lasers 130, 140 and 150 generates the return optical pulses in response to the delayed electrical signals received from the electrical delay circuit 125. In an embodiment, the electrical pulses corresponding to optical pulses emitted at different layers are provided to the one of the first, second or third lasers 130, 140 or 150 associated with that layer, for example, by different delay counters in an FPGA of the electrical delay circuit 125. In alternative configurations, each laser may illuminate multiple layers.

In the depicted embodiment, the fiber ends 133, 143 and 153 of the first, second and third lasers 130, 140 and 150 are spaced equally from one another, and are positioned in a focal plane FP of the collimator 160. In alternative configurations, the optical fibers 132, 142 and 152 are not included, in which case the first, second and third lasers 130, 140 and 150 themselves may be spaced equally from one another in the focal plane FP. The equal spacing between adjacent ones of the fiber ends 133, 143 and 153 may be accomplished using a one-dimensional fiber array 180. Use of the fiber array 180 ensures well-controlled, small spacing between the adjacent fiber ends 133, 143 and 153.

The equally spaced fiber ends 133, 143 and 153 together with the collimator 160 are configured to produce bundles of light rays in the collimated beams 165, 166, and 167 at the different discrete elevation angles, respectively, where the light rays represent trajectories of the return optical pulses. That is, the bundles of return optical pulses in the collimated beams 165, 166, and 167 are respectively emitted from the fiber array 180 at a first elevation return angle corresponding to the first elevation transmission angle 101, a second elevation return angle corresponding to the second elevation transmission angle 102, and a third elevation return angle corresponding to the third elevation transmission angle 103. The return optical pulses may be emitted in the bundles of light rays from the fiber ends 133, 143 and 153 in cone patterns that correspond to the numerical aperture of the optical fibers 132, 142, and 152, respectively.

The positions of the fiber ends 133, 143 and 153 within the focal plane FP determine the elevation angles. For example, the fiber end 133 is located at the focal point of the lens of the collimator 160, and emits the collimated beam 165 that corresponds to the first elevation transmission angle 101 of 0 degrees, as indicated by cone angle 135. The fiber ends 143 and 153 are located in the focal plane of the lens of the collimator 160, but below and above the focal point and the fiber end 133, emit collimated beams 166 and 167 that correspond to the elevation transmission angles 102 and 103, respectively, as indicated by cone angles 145 and 155. In other words, the collimator 160 collimates the return optical pulses emitted from the fiber ends 133, 143 and 153 into collimated beams 165, 166, and 167, which correspond to the first, second and third elevation transmission angles 101, 102 and 103, respectively.

The diffuser 170, which is an extreme elliptical diffuser in the depicted example, diffuses the collimated optical pulses over the predetermined range of azimuthal return angles approximately corresponding to the predetermined range of azimuthal transmission angles 108 for each of the first, second and third elevation transmission angles 101, 102 and 103, respectively. The diffuser 170 does not alter the elevation angles of return optical pulses, or alters them in a minimal way. This is indicated by diffusion patterns 175, 176 and 177. The return optical pulses are emitted from the entire illuminated surface of the diffuser 170, as discussed above, thereby ensuring uniform spatial coverage all three layers of the lidar DUT 105. Accordingly, for every azimuthal and elevation transmission angle of the emitted optical pulses emitted by the lidar DUT 105, there is an azimuthal and elevation return angle of the return optical pulses.

The fiber ends 133, 143 and 153 of the fiber array 180 may be spaced by a distance d, where the distance d is typically related to a diameter of the individual optical fibers 132, 142 and 152 (e.g., about 250 μm diameter). The discrete elevation angles that are created depend on focal length f of the collimator lens of the collimator 160 and on the fiber spacing distance d. Therefore, an increment in elevation angle α may be approximated as $\Delta\alpha \approx d/f$ (in radians), where the increment in angle $\Delta\alpha$ is the difference between adjacent elevation angles. Thus, the discrete elevation angles created in the system 100 can be controlled by the fiber spacing distance d and the focal length f of the collimator lens. For example, two fibers separated by fiber spacing distance of d 0.75 mm and the collimator lens having a focal length f of 50 mm create elevation angles separated by 0.75 mm/50 mm=0.015 rad≈0.86 degrees. Also, the fiber array 180 with 12 fibers, for example, can create 12 discrete elevation angles.

Without the diffuser 170, a collimated laser beam from a single laser covers only one discrete elevation angle and one discrete azimuthal angle, and collimated laser beams from a two-dimensional array of lasers covers only a discrete set of elevation angles and a discrete set of azimuthal angles. In comparison, a one-dimensional vertical array of lasers and the diffuser 170, according to various embodiments herein, cover a discrete set of elevation angles and a continuous range of azimuthal angles. Thus, incorporation of the diffuser 170 and the fiber array 180 enables complete coverage of a large range of the azimuthal angles, as well as multiple elevation angels, at low cost.

As mentioned above, the system 100 also includes the controller 126, which is coupled to memory 128 and includes processor 127. The controller 126 is adapted to support a test sequence in response to emitted optical pulses from the lidar DUT 105, and to provide a simulation scenario (e.g., distance, reflectivity and shape) of emulated targets. The target simulation provided by the electrical delay circuit 125 is performed according to the 3D simulation scene, which is stored in database 129, for example, and retrieved by the controller 126 and/or the processor 127 for controlling the electrical delay circuit 125.

The processor 127, which is tangible and non-transitory, is representative of one or more processors. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 127 (and other processors) of the present teachings is an article of manufacture and/or a machine component. The processor 127 for the controller 126 is configured to execute software instructions stored in the memory 128 to perform functions as described in the various embodiments herein. The processor 127 may be a general-purpose processor or may be part of an application specific integrated circuit (ASIC). The processor 127 may also be (or include) a microprocessor, a microcomputer, a processor chip, a controller, a microcontroller, a digital signal processor (DSP), a state machine, or a programmable logic device. The processor 127 may also be (or include) a logical circuit, including a programmable gate array (PGA) such as a FPGA, or another type of circuit that includes discrete gate and/or transistor logic. The processor 127 may be (or include) a central processing unit (CPU), a graphics processing unit (GPU), or both. Additionally, the processor 127 may comprise multiple processors, parallel processors, or both. Multiple processors may be included in, or coupled to, a single device or multiple devices.

The memory 128 may comprise a main memory, a static memory, or both, where the memories may communicate with each other via a bus (not shown). The memory 128 (and the database 129) described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 128 of the present teachings is an article of manufacture and/or machine component. The memory 128 (and other memories described herein) includes one or more computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known to one of ordinary skill in the art. Memories of the present teachings may be volatile or non-volatile, secure and/or encrypted, unsecure and/or unencrypted. The controller 126, the processor 127 and the memory 128 may be housed within or linked to a workstation such as a computer or another assembly of one or more computing devices, a display/monitor, and one or more input devices (e.g., a keyboard, joysticks and mouse) in the form of a standalone computing system, a desktop or a tablet, for example.

With regard to the electrical delay circuit 125, the processor 127 may be adapted to execute instructions provided in the memory 128 that change the configuration of the electrical delay circuit 125 to emulate desired distances to emulated targets. For example, the processor 127 may include or otherwise control counters within one or more FPGAs. Thus, the electrical delay circuit 125 may be adapted to be dynamically variable, and as such may be adapted to provide distance measurements of a 3D simulated scene of varying magnitudes.

Additional description of lidar test systems is provided by U.S. patent application Ser. No. 17/126,085 to Chan Fong Tan et al., filed Dec. 18, 2020, which is hereby incorporated by reference in its entirety.

Figure 3:
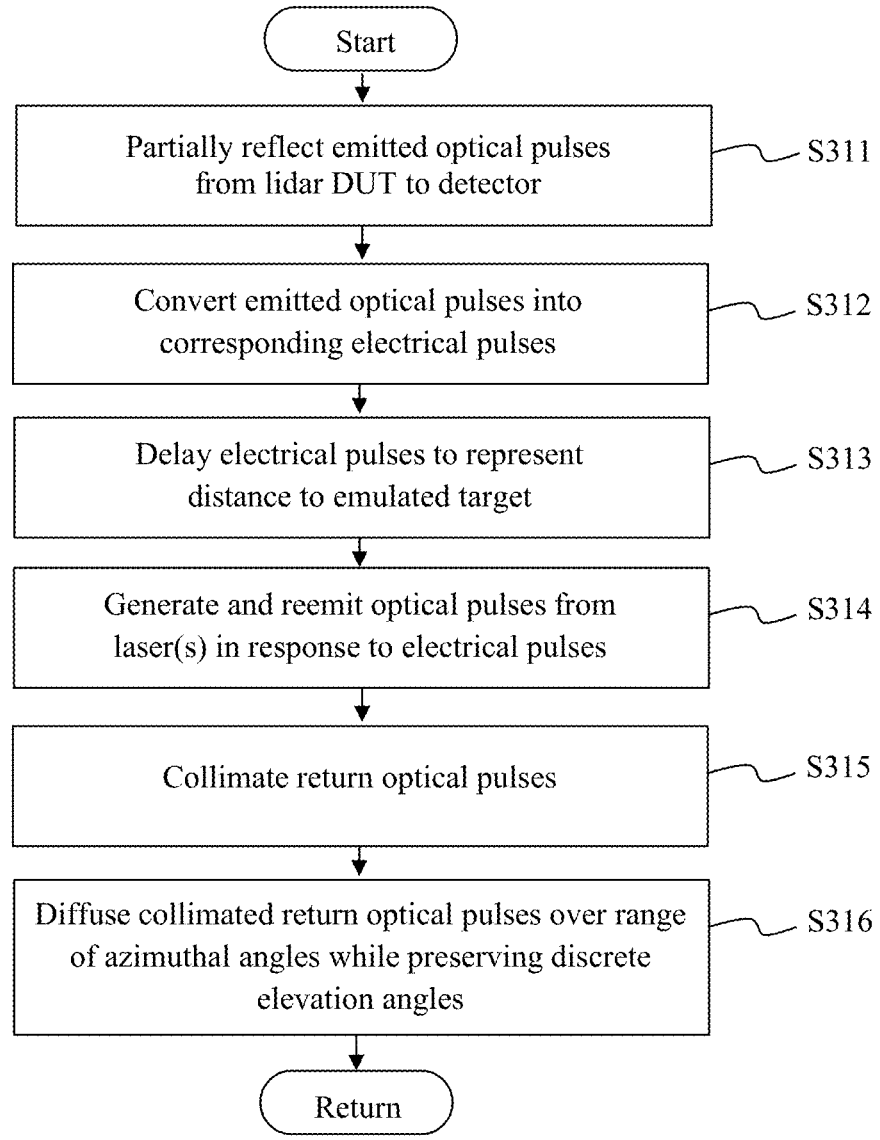
FIG. 3 is a flow diagram showing a method for emulating echo signals for a lidar DUT, according to a representative embodiment.

FIG. 3 is a simplified flow diagram illustrating a method of emulating echo signals reflected from targets in response to a lidar signal transmitted by a lidar DUT, according to a representative embodiment. The method may be implemented on the system 100, discussed above, for example, where the lidar DUT comprises a TOF lidar sensor.

Referring to FIG. 3, optical pulses emitted by the lidar DUT are partially reflected or guided by an optical blocker in block S311 toward a detector. Portions of the optical pulses that are not reflected or guided may be absorbed by the optical blocker or directed away from the lidar DUT. The optical blocker may be a metal box, a mirror, or an optical guide, for example, that intercepts the emitted optical pulses and minimizes the reflections back to the lidar of the lidar DUT. The emitted optical pulses may be transmitted at multiple azimuthal transmission angles and/or multiple elevation transmission angles, as discussed above. The multiple azimuthal transmission angles are pseudo-continuous over a predetermined range of azimuthal transmission angles, and the multiple elevation transmission angles are discrete at predetermined angles.

In block S312, the emitted optical pulses that have been partially reflected or guided are received by the detector, and converted into corresponding electrical pulses. The detector may include photo diodes, photo resistors and/or other optical transducers for converting the emitted optical pulses into the electrical pulses.

In block S313, the electrical pulses are delayed by an electrical delay circuit. The length of the delay for each of the electrical pulses represents distance to the at least one emulated target which would reflect the corresponding optical pulses. Information regarding the at least one emulated target may be provided by a 3D simulation scene, as is well known to one skilled in the art. The information may include the location of each emulated target in relation to the lidar DUT, direction, velocity and acceleration of the emulated target (if any) in relation to the lidar DUT, and dimensions/cross-section of the emulated target. The location provides the distance and azimuthal and/or elevation angles of the emulated target from the lidar DUT.

In block S314, return optical pulses are generated by at least one laser in response to the delayed electrical pulses, and reemitted to the lidar DUT. That is, the at least one laser converts the electrical pulses back into optical pulses, and the optical pulses are emitted in order to emulate echo signals from the at least one emulated target responsive to the originally emitted optical pulses. When the lidar DUT transmits the emitted optical pulses at one elevation, one laser may be used to reemit the return optical pulses. When the lidar DUT transmits the emitted optical pulses at multiple elevation angles or layers, multiple lasers, e.g., arranged in a one dimensional array, may be used to reemit the return optical pulses in corresponding elevation angles or layers, respectively.

In block S315, the return optical pulses reemitted by the at least one laser are collimated by a collimator. When multiple lasers are used to reemit the return optical pulses at the different discrete elevation angles, the collimator collimates the return optical pulses in discrete layers corresponding to the elevation angels.

In block S316, the collimated return optical pulses are diffused over a predetermined range of azimuthal return angles by a diffuser, while preserving discrete elevation angles. When multiple lasers are used to reemit the return optical pulses at the different elevation angles, the diffuser diffuses the collimated return optical pulses over the predetermined range of azimuthal return angles at each of the discrete layers corresponding to the elevation angels. Accordingly, the return optical pulses are provided to the lidar DUT at azimuthal angles corresponding to all azimuthal angles of the emitted optical pulses transmitted over the predetermined range of azimuthal transmission angles, and at elevation angles corresponding to all elevation angles of the emitted optical pulses transmitted over the set of discrete elevation transmission angles. The return optical pulses therefore preserve the direction of the emitted optical pulses, so that the return optical pulses arrive back at the lidar DUT at the same azimuthal and elevation angles at which the corresponding emitted optical pulses were originally transmitted.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for emulating return optical pulses from at least one emulated target in response to a lidar signal, the system comprising:
    an optical blocker configured to partially reflect or guide optical pulses emitted by a time of flight (TOF) lidar sensor;
    a detector configured to detect the partially reflected or guided optical pulses, and to output corresponding electrical pulses;
    an electrical delay circuit configured to delay the electrical pulses;
    at least one laser configured to reemit return optical pulses in response to the delayed electrical pulses;
    a collimator configured to collimate the return optical pulses; and
    a diffuser configured to diffuse the collimated return optical pulses over a predetermined range of azimuthal return angles toward the TOF lidar sensor.

2. The system of claim 1, wherein the at least one laser configured to reemit the return optical pulses comprises a plurality of lasers.

3. The system of claim 2, wherein the plurality of lasers are spaced equally and positioned in a focal plane of the collimator.

4. The system of claim 3, wherein the plurality of lasers are arranged in a fiber array.

5. The system of claim 3, wherein the equally spaced plurality of lasers are configured to produce bundles of optical rays at discrete angles.

6. The system of claim 5, where the discrete angles of optical rays correspond to elevation angles of the lidar pulses emitted by the TOF lidar sensor.

7. The system of claim 1, wherein the optical blocker comprises a metal box, a mirror or an optical guide.

8. The system of claim 1, wherein the return optical pulses diffused over the predetermined range of azimuthal return angles correspond to a predetermined range of azimuthal transmission angles of the emitted optical pulses emitted by the TOF lidar sensor.

9. The system of claim 1, wherein the electrical delay circuit delays the electrical pulses by delay amounts representing distances between the TOF lidar sensor and one or more emulated targets, respectively.

10. A method of emulating return optical pulses from at least one emulated target in response to optical pulses emitted from a time of flight (TOF) lidar device under test (DUT), the method comprising:
    partially reflecting or guiding emitted optical pulses toward a detector, wherein the emitted optical pulses are emitted by the lidar DUT over a plurality of transmission angles;
    receiving the partially reflected or guided optical pulses at the detector, and converting the partially reflected or guided optical pulses into corresponding electrical pulses;
    delaying the electrical pulses to represent distance to the at least one emulated target;
    generating return optical pulses by at least one laser in response to the delayed electrical pulses, and reemitting the return optical pulses from the at least one laser to the lidar DUT;
    collimating the reemitted return optical pulses; and
    diffusing the collimated return optical pulses over a plurality of return angles respectively corresponding to at least the plurality of transmission angles, enabling the lidar DUT to associate the diffused return optical pulses with the emitted optical pulses.

11. The method of claim 10, wherein the plurality of transmission angles comprise a predetermined range of discrete azimuthal transmission angles, and
    wherein the collimated return optical pulses are diffused by a line diffuser such that the plurality of return angles comprise a predetermined range of continuous azimuthal return angles covering the predetermined range of discrete azimuthal transmission angles.

12. The method of claim 11, wherein the plurality of transmission angles further comprise a plurality of discrete elevation transmission angles, and
    wherein the collimated return optical pulses collimate the reemitted return optical pulses into a plurality of layers corresponding to the plurality of discrete elevation transmission angles.

13. The method of claim 12, wherein the at least one laser comprises a plurality of lasers.

14. The method of claim 13, wherein the plurality of lasers are arranged in a fiber array.

15. A system for emulating return optical pulses from at least one emulated target in response to a lidar signal, the system comprising:
- an optical blocker configured to partially reflect or guide optical pulses emitted by a lidar device under test (DUT), wherein the optical pulses are emitted over a predetermined pseudo-continuous range of azimuthal transmission angles and at a plurality of discrete elevation transmission angles;
- a detector configured to detect the partially reflected or guided optical pulses, and to output corresponding electrical pulses;
- an electrical delay circuit configured to delay the electrical pulses according to distances to the at least one emulated target;
- a plurality of lasers configured to reemit return optical pulses in response to the delayed electrical pulses, wherein each laser of the plurality of lasers corresponds to one of the plurality of discrete elevation transmission angles;
- a collimator configured to collimate the return optical pulses; and
- a diffuser configured to diffuse the collimated return optical pulses over a predetermined range of azimuthal return angles toward the lidar DUT, wherein the predetermined range of azimuthal return angles is continuous, thereby covering the predetermined pseudo-continuous range of azimuthal transmission angles.

16. The system of claim 15, wherein the optical blocker comprises a metal box, a mirror or an optical guide.

17. The system of claim 15, wherein the detector comprises at least one of an avalanche photo diode, a photo diode or a photo resistor.

18. The system of claim 15, further comprising:
- a plurality of optical fibers connected to the plurality of lasers, respectively, for transmitting the reemitted return optical pulses, wherein the plurality of optical fibers have a corresponding plurality of fiber ends arranged in a one-dimensional fiber array positioned in a focal plane of the collimator.

19. The system of claim 18, wherein the reemitted return optical pulses are transmitted from the plurality of fiber ends in bundles of optical rays at the discrete elevation transmission angles, respectively.

20. The system of claim 15, further comprising:
- a controller programmed to control a configuration of the electrical delay circuit to delay the electrical pulses according to the distances to the at least one emulated target, and to direct the delayed electrical pulses to the plurality of lasers corresponding to one of the plurality of discrete elevation transmission angles, respectively.

* * * * *